US010988141B2

(12) United States Patent
Honda et al.

(10) Patent No.: US 10,988,141 B2
(45) Date of Patent: Apr. 27, 2021

(54) ENGINE LUBRICATION SYSTEM (71) Applicant: Mazda Motor Corporation, Hiroshima (JP)

(72) Inventors: Kenta Honda, Aki-gun (JP); Masanori Hashimoto, Aki-gun (JP); Daisuke Fukuda, Aki-gun (JP); Atsushi Yamada, Aki-gun (JP); Daisuke Shimo, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/930,368

(22) Filed: Jul. 16, 2020

(65) Prior Publication Data

US 2021/0024070 A1 Jan. 28, 2021

(30) Foreign Application Priority Data

Jul. 25, 2019 (JP) .............................. JP2019-136839

(51) Int. Cl.
*B60W 30/184* (2012.01)
*B60W 10/06* (2006.01)
*B60W 10/10* (2012.01)
*F01M 1/02* (2006.01)
*F01M 1/08* (2006.01)
*F16H 59/72* (2006.01)
*F16H 59/78* (2006.01)
*F16H 61/02* (2006.01)

(52) U.S. Cl.
CPC .......... *B60W 30/184* (2013.01); *B60W 10/06* (2013.01); *B60W 10/10* (2013.01); *F01M 1/02* (2013.01); *F01M 1/08* (2013.01); *F16H 59/72* (2013.01); *F16H 59/78* (2013.01); *F16H 61/0213* (2013.01); *B60W 2510/0676* (2013.01); *B60W 2510/1005* (2013.01); *B60W 2510/1075* (2013.01); *F01M 2001/0253* (2013.01); *F01M 2250/60* (2013.01); *F16H 2061/0227* (2013.01)

(58) Field of Classification Search
CPC ................. B60W 10/06; B60W 10/10; B60W 2510/1075; B60W 30/184; F16H 61/0213
See application file for complete search history.

(56) References Cited

U.S. PATENT DOCUMENTS

| 4,856,628 A * | 8/1989 | Momiyama ........... B60W 10/06 192/3.58 |
| 2012/0090580 A1* | 4/2012 | Hu ........................ F02D 13/028 123/564 |
| 2020/0132059 A1* | 4/2020 | Ikemoto ................ B60W 20/13 |

FOREIGN PATENT DOCUMENTS

JP 2018-189022 A 11/2018

* cited by examiner

*Primary Examiner* — Stacey A Fluhart
(74) *Attorney, Agent, or Firm* — Xsensus LLP (57) ABSTRACT An engine lubrication system including: an oil pump configured to be driven by an engine; an oil jet mechanism configured to inject oil pressure-fed by the oil pump to a piston; and circuitry configured to set a target hydraulic pressure of the oil injected from the oil jet mechanism according to an operation state of the engine; determine a hydraulic pressure state of the oil injected from the oil jet mechanism; and change a gear stage of the automatic transmission to a lower gear stage in a case that a predetermined condition between the determined hydraulic pressure state and the target hydraulic pressure is satisfied.

17 Claims, 7 Drawing Sheets

M1 FIRST GEAR SHIFT MAP

FIG. 4

M2 SECOND GEAR SHIFT MAP

ENGINE LUBRICATION SYSTEM

CROSS-REFERENCE TO RELATED APPLICATION

The present application claims priority to JP 2019-136839, filed Jul. 25, 2019, the entire contents of which are incorporated herein by reference.

TECHNICAL FIELD

The present disclosure relates to an engine lubrication system and, in particular, to an engine lubrication system capable of setting a target hydraulic pressure of oil that is injected by an oil jet mechanism according to an operation state of an engine.

BACKGROUND ART

Conventionally, for a purpose of preventing burning and strength degradation of a piston that contacts high-temperature combustion gas, an oil jet mechanism that suppresses a temperature increase of the piston by spraying engine lubrication oil onto a piston inner surface from a connecting rod side has been known.

Such an oil jet mechanism sprays the lubrication oil that is pressure-fed from an oil pump on the piston inner surface using a hydraulic pressure. Thus, when the hydraulic pressure is excessively high, a flow speed of the lubrication oil becomes excessively high, which causes the lubrication oil to spread in the form of a fine mist. On the other hand, when the hydraulic pressure is excessively low, the flow speed of the lubrication oil is reduced, and thus an amount of the injection oil that is required to cool the piston cannot be sprayed. As a result, cooling efficiency is degraded.

To handle such problems, a technique of concurrently using a variable volume oil pump capable of changing a discharge volume for generating the hydraulic pressure of the lubrication oil and the oil jet mechanism has been proposed.

A hydraulic controller disclosed in JP-A-2018-189022 (patent document 1) includes: a variable volume oil pump that is driven by an engine; an oil jet mechanism; piston temperature estimation means that estimates a piston temperature on the basis of an operation state of the engine; and requested discharge volume setting means that sets a requested discharge volume to the oil pump in order to generate a requested piston cooling hydraulic pressure (a target hydraulic pressure) corresponding to the estimated piston temperature. The hydraulic controller is configured that, when the estimated piston temperature exists in a specified temperature range where a deposit is likely to be produced on a top surface of the piston, the requested hydraulic pressure is shifted to be higher than an actuation pressure of the oil jet mechanism and that, when the estimated piston temperature exists in a range other than the specified temperature range, the requested hydraulic pressure is shifted to be lower than the actuation pressure of the oil jet mechanism.

SUMMARY

When the estimated piston temperature exists in the specified temperature range, the hydraulic controller disclosed in Patent document 1 sets the requested hydraulic pressure to be higher than the actuation pressure of the oil jet mechanism, so as to secure a piston cooling effect.

However, as recognized by the present inventor, the technique disclosed in Patent document 1 has the following control problem. In the case where an engine speed is low, the oil pump cannot generate the hydraulic pressure that is equal to or higher than the actuation pressure of the oil jet mechanism even when the requested hydraulic pressure is set to be higher than the actuation pressure of the oil jet mechanism, and thus the amount of the injection oil that is required to cool the piston may not be secured.

Figure 7:
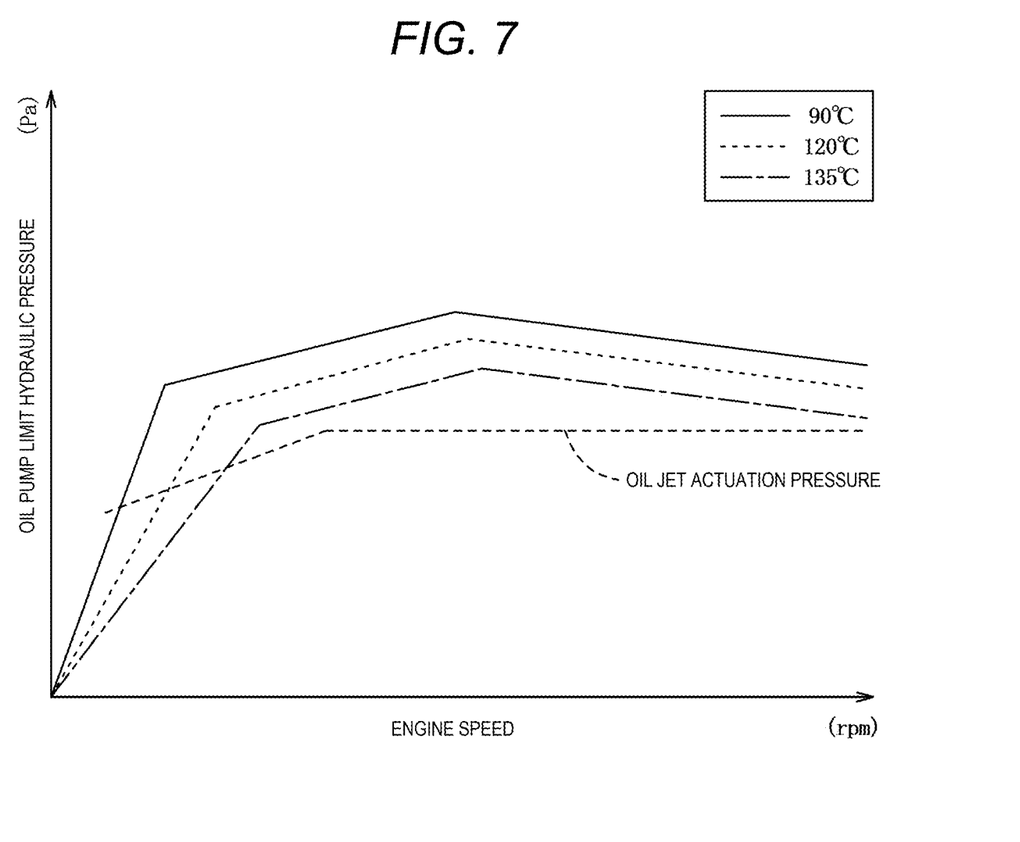
FIG. 7 is a graph illustrating a relationship between an engine speed and an oil pump limit hydraulic pressure.

As illustrated in FIG. 7, the oil pump is directly driven by the engine. Thus, a limit hydraulic pressure that can be generated by the oil pump is increased at a constant increase rate to the specified engine speed in the form of a linear function, and the increase rate is set to be lower than before at the specified engine speed and higher.

Meanwhile, as indicated by a broken line, the actuation pressure capable of delivering performance of the oil jet mechanism is regarded to have a specified set value coordinated such that the pressure is increased along with an increase in the engine speed.

That is, due to a mechanism of the oil pump, in a situation where the engine speed is low, even in the case where the limit hydraulic pressure is reduced and the discharge volume capable of generating the target hydraulic pressure of the lubrication oil is set, the limit hydraulic pressure of the oil pump itself falls below the actuation pressure of the oil jet mechanism. Thus, it is difficult to secure the amount of the injection oil that is required to cool the piston.

In addition, the limit hydraulic pressure of the oil pump tends to be reduced as an oil temperature of the lubrication oil is increased. Thus, when the oil temperature is high at the same engine speed, it is not easy to generate the hydraulic pressure that is equal to or higher than the actuation pressure of the oil jet mechanism. In particular, the piston made of iron has lower thermal conductivity than the piston made of an aluminum alloy though a structural strength thereof can be secured. Thus, it is difficult to diffuse heat of the iron piston, and cooling of such a piston tends to be insufficient. As a result, carbonization of the lubrication oil that is retained in a ring groove section or the like is concerned.

As it has been described so far, depending on an engine operating situation such as the engine speed and the oil temperature, the hydraulic pressure of the oil that is injected by the oil jet mechanism cannot be secured. Thus, it is impossible to exert a sufficient cooling function.

A purpose of the present disclosure is to provide an engine lubrication system capable of securing an amount of injection oil required to cool a piston regardless of an operating situation, and the like.

According to one exemplary embodiment, the present disclosure is directed to an engine lubrication system including: an oil pump configured to be driven by an engine; an oil jet mechanism configured to inject oil pressure-fed by the oil pump to a piston; and circuitry configured to set a target hydraulic pressure of the oil injected from the oil jet mechanism according to an operation state of the engine; determine a hydraulic pressure state of the oil injected from the oil jet mechanism; and change a gear stage of the automatic transmission to a lower gear stage in a case that a predetermined condition between the determined hydraulic pressure state and the target hydraulic pressure is satisfied.

According to another exemplary embodiment, the present disclosure is directed to a vehicle comprising: an engine; an automatic transmission; an oil pump configured to be driven by the engine; an oil jet mechanism configured to inject oil pressure-fed by the oil pump to a piston; and circuitry configured to determine a target hydraulic pressure of the oil injected from the oil jet mechanism based on an operation state of the engine; detect a hydraulic pressure of the oil injected from the oil jet mechanism; and change a gear stage of the automatic transmission to a lower gear stage in a case that a predetermined condition is satisfied between the target hydraulic pressure and the detected hydraulic pressure.

According to another exemplary embodiment, the disclosure is directed to a method performed by an engine lubrication system including an oil pump configured to be drive by an engine, and an oil jet mechanism configured to inject oil pressure-fed by the oil pump to a piston, the method comprising: setting a target hydraulic pressure of the oil injected from the oil jet mechanism according to an operation state of the engine; detecting a hydraulic pressure state of the oil injected from the oil jet mechanism; and changing a gear stage of the automatic transmission to a lower gear stage in a case that a predetermined condition between the determined hydraulic pressure state and the target hydraulic pressure is satisfied.

The engine lubrication system according to the present disclosure can secure the injection oil amount that is required to cool the piston by using the existing gear shift function of the automatic transmission regardless of the operating situation.

DETAILED DESCRIPTION

A description will hereinafter be made on modes for carrying out the disclosure with reference to the drawings. The following description of preferred embodiments is essentially and merely illustrative and thus has no intention to limit the present disclosure, application subjects thereof, and application thereof.

First Embodiment

A description will hereinafter be made on a first embodiment of the present disclosure with reference to FIG. 1 to FIG. 5.

Figure 1:
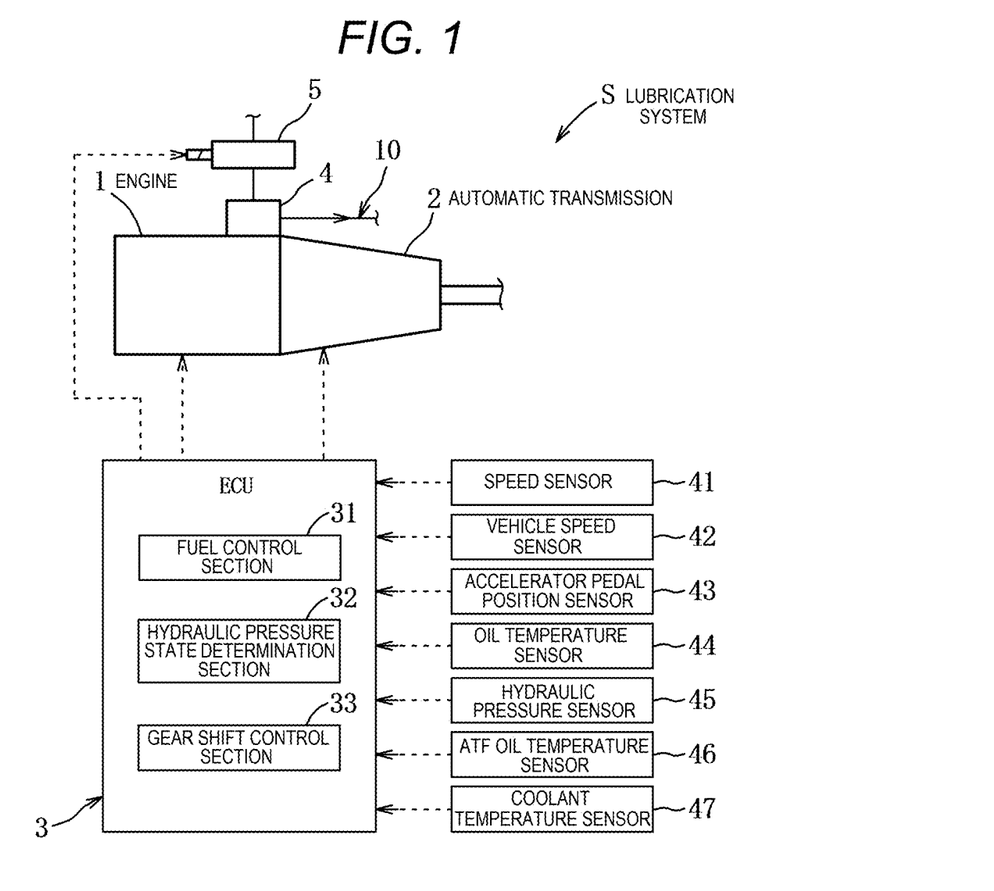
FIG. 1 is a schematic configuration diagram of an engine lubrication system according to a first embodiment.

As illustrated in FIG. 1, an engine lubrication system S (a lubrication device) according to this first embodiment includes, as main components, an engine 1 as a six-cylinder diesel engine, an automatic transmission 2, an electronic control unit (ECU) 3 (control means) for integrally controlling the lubrication system S, various sensors 41 to 47, and the like, for example. Optionally, the ECU may include the processor 835 and other circuitry in system 800 of FIG. 8, which may be implemented as a single processor-based system, or a distributed processor based system.

First, a description will be made on the engine 1.

In the engine 1, a cylinder head, a cylinder block, a crankcase, and an oil pan that collects and stores lubrication oil are vertically coupled to each other, and pistons, each of which is made of iron and can slide in respective one of six cylinder bores formed in the cylinder block, and a crankshaft which is axially supported by the crankcase in a freely rotatable manner are coupled to each other by connecting rods (none of them are illustrated).

The engine 1 includes: a mechanical oil pump 4 that is driven by rotation of the crankshaft and has a variable volume mechanism; and an oil feed passage 10 that is coupled to this oil pump 4 and through which oil, a pressure of which is increased, as the lubrication oil is delivered to each lubrication portion of the engine 1.

Figure 2:
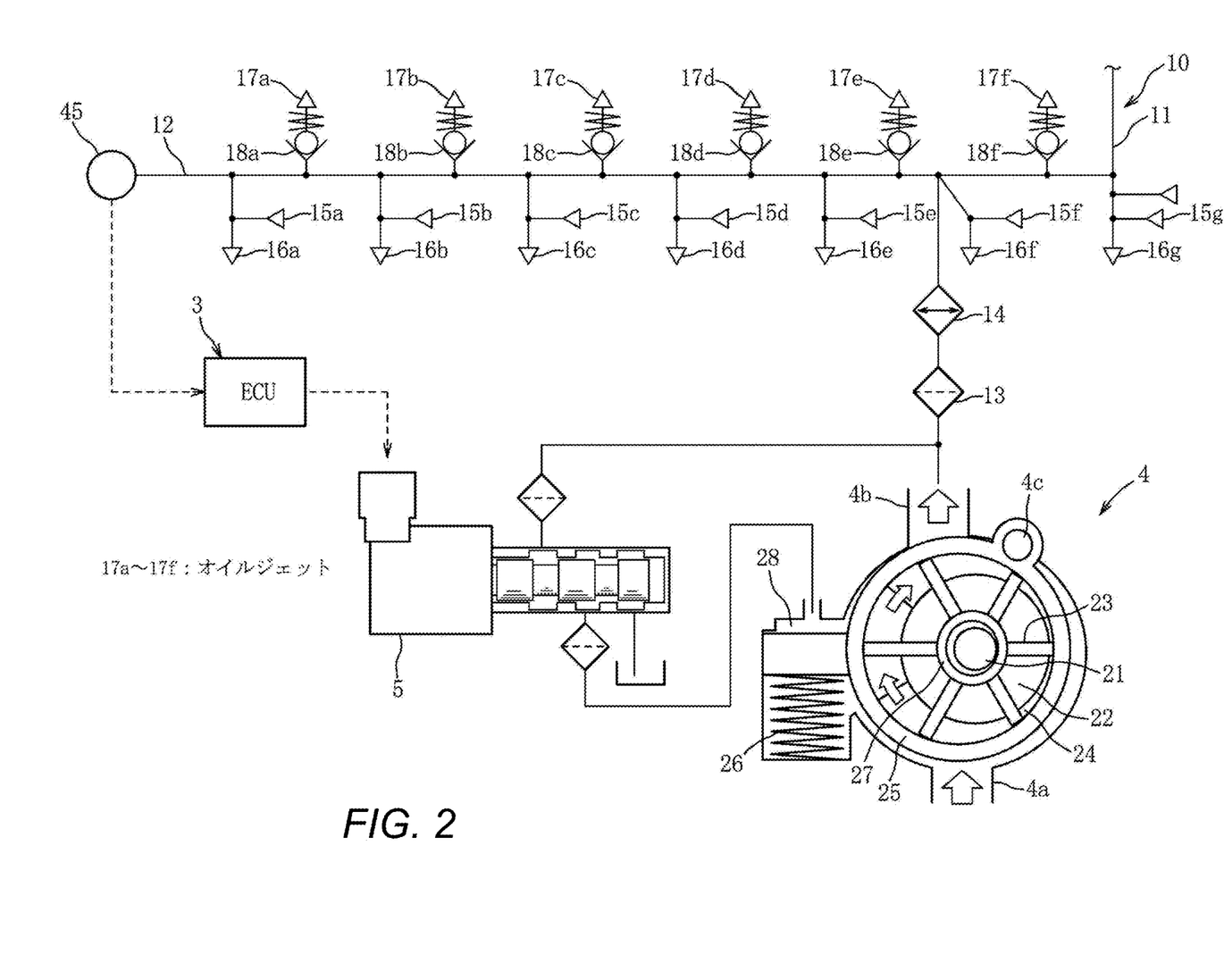
FIG. 2 is a circuit diagram of a main section of the engine lubrication system.

As illustrated in FIG. 2, the oil feed passage 10 includes: a communication passage 11 that communicates with the oil pump 4 and extends in the cylinder block from the oil pan to the cylinder head; a main gallery 12 that is branched from this communication passage 11 and extends in a cylinder arrangement direction; the hydraulic pressure sensor 45 that detects a hydraulic pressure of the oil pressure-fed in this main gallery 12; a plurality of oil passages (not illustrated), each of which is branched from the communication passage 11 in the cylinder head; and the like. An oil strainer (not illustrated) that faces the oil pan is coupled to a suction port 4a of the oil pump 4. In the communication passage 11 that communicates with a discharge port 4b of the oil pump 4, a pressure regulation valve 5 for the oil pump 4, an oil filter 13, an oil cooler 14, and the like are disposed in an order from an upstream side.

The main gallery 12 communicates with: oil supply sections 15a to 15g of for metal bearings disposed in seven journal bearing sections, each of which supports the crankshaft in a manner to allow free rotation thereof; oil supply sections 16a to 16g of the connecting rods; and oil jets 17a to 17f (oil jet mechanisms), each of which injects cooling oil to a back surface (inner surface) side of respective one of the six pistons.

Check valves 18a to 18f, each of which restricts a flow of the oil to one direction toward respective one of the oil jets 17a to 17f, are disposed between the main gallery 12 and the oil jets 17a to 17f.

The oil pump 4 is configured to be able to regulate a pump volume to a discharge volume that corresponds to a target hydraulic pressure in order to regulate the hydraulic pressure of the oil flowing through the oil feed passage 10 (the main gallery 12) to the target hydraulic pressure.

As illustrated in FIG. 2, the oil pump 4 has a housing, a drive shaft 21, a pump element, a cam ring 25, a spring 26, a ring member 27, and the like.

The housing is configured to include: a pump body that has a pump accommodating chamber; and a cover member that closes one side opening of this pump body. The drive shaft substantially penetrates a center of the pump accommodating chamber, is supported by the housing in a freely rotatable manner, and is rotationally driven by the crankshaft.

The pump element is configured to include: a rotor 22 that is accommodated in the pump accommodating chamber and a central portion of which is joined to the drive shaft 21; and a plurality of vanes 23, each of which is accommodated in respective one of a plurality of slits in a manner to freely and routinely appear, the plurality of slits being formed in an outer circumferential portion of this rotor 22 by being notched radially.

The cam ring 25 is arranged on an outer circumferential side of the pump element in a manner to be able to be eccentric to a rotation center of the rotor 22, and cooperates with the rotor 22 and an adjacent pair of the vanes 23 to define a pump chamber 24.

As illustrated in FIG. 2, the spring 26 is an urging member that is accommodated in the pump body and constantly urges the cam ring 25 to a side where an eccentric amount thereof with respect to the rotation center of the rotor 22 is increased.

The ring member 27 includes a pair of ring-shaped members that are disposed in a freely slidable manner on both sides of an inner circumferential side of the rotor 22 and each of which has a smaller diameter than the rotor 22. In the housing, a pressure chamber 28 that is defined by an inner circumferential surface of the housing and an outer circumferential surface of the cam ring 25 is formed.

The oil pump 4 is configured that, when the oil is introduced into the pressure chamber 28, the cam ring 25 swings on a fulcrum 4a, the rotor 22 becomes relatively eccentric to the cam ring 25, and the discharge volume of the oil pump 4 is changed. Regulation oil that is supplied to the pressure chamber 28 is supplied thereto from the communication passage 11, which communicates with the discharge port 4b, via the pressure regulation valve 5.

The pressure regulation valve 5 constructed of a linear solenoid valve is driven by a drive duty ratio signal that is output from the ECU 3. As the drive duty ratio is reduced, an amount of the oil supplied to the pressure chamber 28 is reduced, and a discharge amount of the oil pump 4 is increased. As the drive duty ratio is increased, the amount of the oil supplied to the pressure chamber 28 is increased, and the discharge amount of the oil pump 4 is reduced.

Next, a description will be made on the automatic transmission 20.

As illustrated in FIG. 1, the automatic transmission 2 is coupled to the engine 1 through a torque converter (not illustrated). This automatic transmission 2 establishes any of forward travel gear stages (for example, a first gear to a sixth gear in a D range) and a reverse travel gear stage to change a rotational frequency of a crankshaft 11 to a desired rotational frequency, and transmits the desired rotational frequency to drive wheels (not illustrated). Here, a plurality of the forward travel gear stages only needs to exist, and is not limited to the first to sixth gear stages.

Next, a description will be made on the ECU 3.

The ECU 3 is configured to include a central processing unit that runs various programs, memory (RAM, ROM), an input/output bus, and the like. This ECU 3 is electrically connected to a speed sensor 41, a vehicle speed sensor 42, an accelerator pedal position sensor 43, an oil temperature sensor 44, the hydraulic pressure sensor 45, an ATF oil temperature sensor 46, and a coolant temperature sensor 47.

The speed sensor 41 detects the speed of the engine 1 on the basis of the rotational frequency of the crankshaft, and outputs a detection signal. The vehicle speed sensor 42 detects a travel speed on the basis of a rotational frequency of the wheel, and outputs a detection signal. The accelerator pedal position sensor 43 detects a depression amount of an accelerator pedal (not illustrated), and outputs a detection signal. The oil temperature sensor 44 detects a temperature of the oil that flows through the oil feed passage 11, and outputs a detection signal. The hydraulic pressure sensor 45 detects a pressure of the oil that flows through the oil feed passage 11, and outputs a detection signal. The ATF oil temperature sensor 46 detects a temperature of actuation oil (ATF) in the automatic transmission 2, and outputs a detection signal. The coolant temperature sensor 47 detects a coolant temperature in the engine 1, and outputs a detection signal. As illustrated in FIG. 2, in this embodiment, in order to detect an actual hydraulic pressure of the oil that is actually injected from each of the oil jets 17a to 17f with a high degree of accuracy, the hydraulic pressure sensor 45 is disposed at a position in the main gallery 12 near the oil jets 17a to 17f.

The ECU 3 is configured that, when determining a hydraulic pressure insufficient state where the actual hydraulic pressure of the oil injected from each of the oil jets 17a to 17f is insufficient for the target hydraulic pressure, the ECU 3 can execute shift pattern changing control for switching between gear shift maps M1, M2 of the automatic transmission 20.

As illustrated in FIG. 1, the ECU 3 includes a fuel control section 31, a hydraulic pressure state determination section 32, a gear shift control section 33, and the like as primary components.

First, a description will be made on the fuel control section 31.

The fuel control section 31 reads target torque of the engine via a target torque map (not illustrated) that is set in advance on the basis of an accelerator pedal position detected by the accelerator pedal position sensor 43 and the engine speed detected by the speed sensor 41, and reads a target fuel injection amount via a target fuel injection amount map (not illustrated) that is set in advance on the basis of this target torque, the engine speed, and the like. Then, the fuel control section 31 regulates an excitation time of a fuel injection valve on the basis of the set target fuel injection amount and a fuel pressure in a common rail, and thereby controls a fuel injection amount to be supplied to a combustion chamber in each of the cylinders.

When the ATF temperature of the automatic transmission 2 that is detected by the ATF oil temperature sensor 46 is equal to or higher than an ATF set temperature (an automatic transmission set temperature), the fuel control section 31 executes torque down control for subtracting a fuel correction amount from the target fuel injection amount. The fuel correction amount is set to be increased as a deviation between the ATF temperature and the ATF set temperature is increased when the ATF temperature is equal to or higher than the ATF set temperature. This is because, when the ATF temperature becomes equal to or higher than the ATF set temperature, responsiveness is degraded, gear shift timing becomes off, lubricity is degraded, and the like, which degrades product reliability of the automatic transmission 2.

Next, a description will be made on the hydraulic pressure state determination section 32.

The hydraulic pressure state determination section 32 calculates the target hydraulic pressure of the oil that is injected from each of the oil jets 17a to 17f. Here, in this embodiment, the target hydraulic pressure is a hydraulic pressure for generating the flow speed (an injection speed) that is required to secure an injection oil amount when the injection oil amount that is required for cooling the piston is injected from each of the oil jets 17a to 17f to the respective piston.

The hydraulic pressure state determination section 32 has: a simulation model formula with which it is possible to estimate a piston temperature by using five elements of the engine speed, an engine load (the accelerator pedal position), the oil temperature, the engine coolant temperature, and an actual fuel injection amount; and a target hydraulic pressure map (not illustrated) that defines a corresponding relationship between the target hydraulic pressure required to cool the piston to a specified target temperature and the piston temperature. The hydraulic pressure state determination section 32 estimates the piston temperature by applying output values from the sensors 41, 43, 44, 47 and the fuel injection amount calculated by the fuel control section 31 to the model formula, and calculates the target hydraulic pressure by applying the estimated piston temperature to the target hydraulic pressure map.

The hydraulic pressure state determination section 32 is configured to be able to determine the hydraulic pressure insufficient state.

The hydraulic pressure state determination section 32 determines the hydraulic pressure insufficient state in the case where the actual hydraulic pressure that is detected by the hydraulic pressure sensor 45 is equal to or lower than the target hydraulic pressure that is acquired by the calculation and a period in which a deviation therebetween is equal to or larger than a threshold value continues for a specified time (for example, one to two seconds). In addition, the hydraulic pressure state determination section 32 determines the hydraulic pressure insufficient state in the case where the oil temperature that is detected by the oil temperature sensor 44 is equal to or higher than a set temperature.

Next, a description will be made on the gear shift control section 33.

The gear shift control section 33 has the first and second gear shift maps M1, M2 in each of which a shift pattern is set in advance on the basis of the travel speed of the vehicle and the accelerator pedal position.

Figure 3:
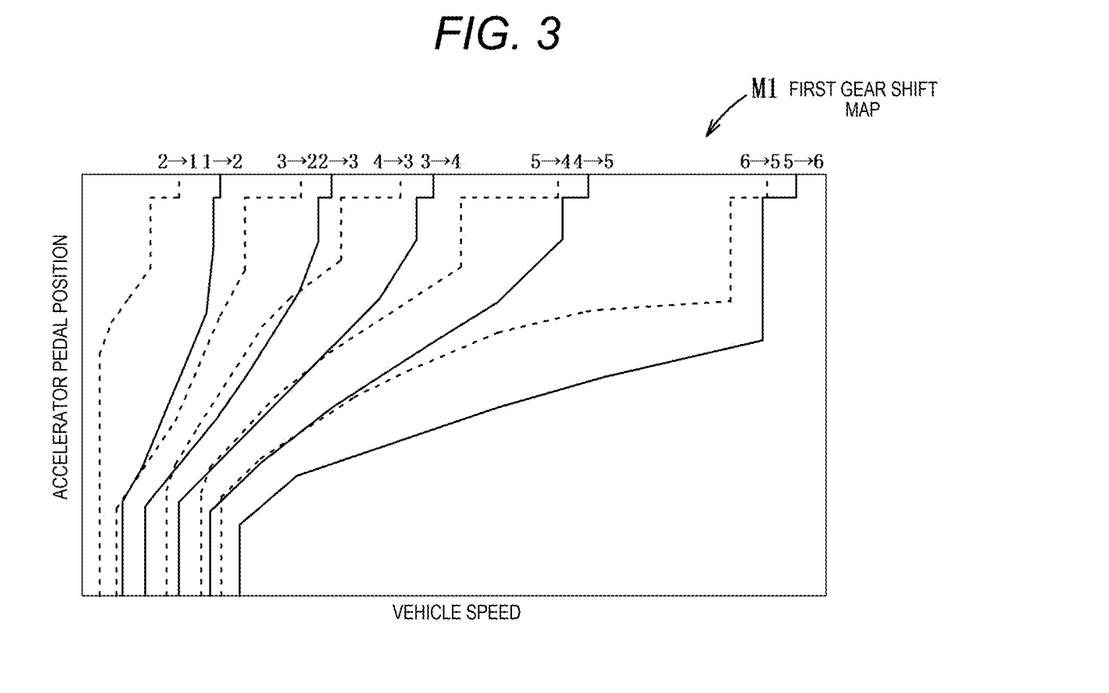
FIG. 3 is a gear shift map before a shift pattern is changed.
Figure 4:
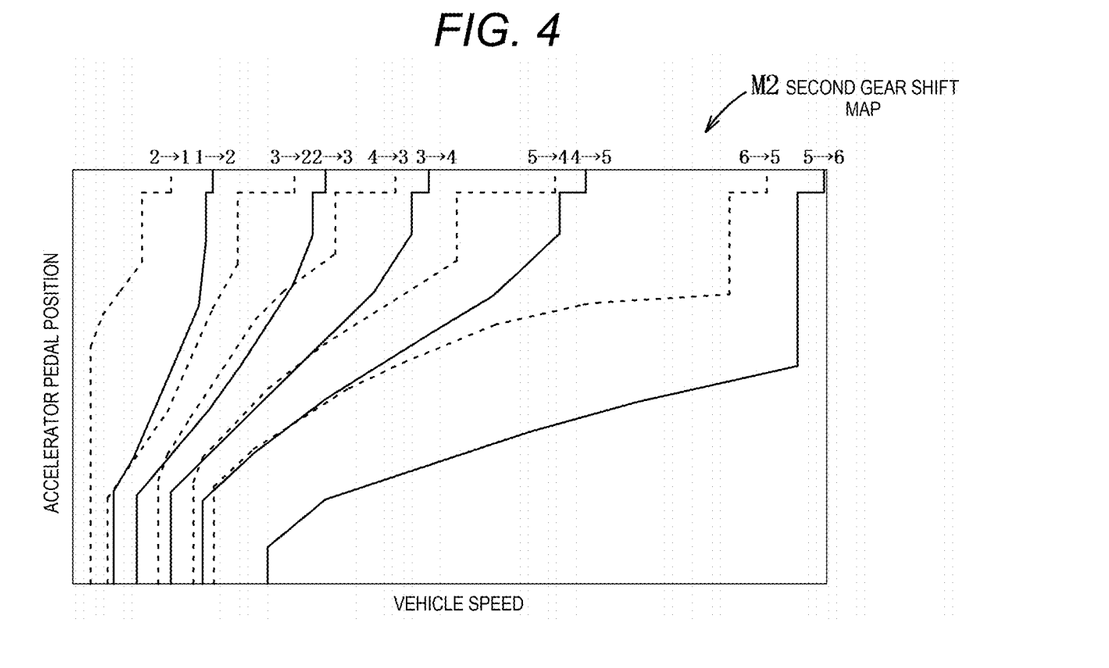
FIG. 4 is a gear shift map after the shift pattern is changed.

As illustrated in FIG. 3, in the first gear shift map M1, gear shift lines that define shift-ups (solid lines) from the first gear to the sixth gear and gear shift lines that define shift-downs (broken lines) during normal travel are set. As illustrated in FIG. 4, in the second gear shift map M2, gear shift lines that define the shift-ups (solid lines) from the first gear to the sixth gear and gear shift lines that define the shift-downs (broken lines) in the hydraulic pressure insufficient state are set. A difference therebetween is a point that the entire sixth gear shift line for the shift-up to the sixth gear as the highest gear stage in the second gear shift map M2 is shifted to a higher vehicle speed side than the sixth gear shift line for the shift-up to the sixth gear in the first gear shift map M1.

During the normal travel, the gear shift control section 33 reads the gear stage as a switching destination via the first gear shift map M1, and subjects a gear-shift solenoid valve (not illustrated) to on/off control. Then, the gear shift control section 33 switches a spool position of each shift valve via the gear-shift solenoid valve, and fastens friction fastening elements to be combined for corresponding one of the gear stages.

In addition, when the hydraulic pressure state determination section 32 determines the hydraulic pressure insufficient state, the gear shift control section 33 executes the shift pattern changing control for changing the gear shift map from the first gear shift map M1 to the second gear shift map M2 and reading the gear stage as the switching destination via this second gear shift map M2.

When the first gear shift map M1 is selected, 0 is assigned to a flag F. When the second gear shift map M2 is selected, 1 is assigned to the flag F.

By executing the shift pattern changing control, a travel state is changed from a state where the vehicle travels at the sixth gear by using the first gear shift map M1 to a state where the vehicle travels at the fifth gear by using the second gear shift map M2, and the speed of the engine 1 is increased.

In the case where the ATF oil temperature that is detected by the ATF oil temperature sensor 46 is equal to or higher than the ATF set temperature, the gear shift control section 33 executes the shift pattern changing control to return the gear stage, which has been changed to the lower gear stage, to the original gear stage. More specifically, when the hydraulic pressure state determination section 32 determines the hydraulic pressure insufficient state, the travel state is changed from the state where the vehicle travels at the fifth gear by using the second gear shift map M2 to the state where the vehicle travels at the sixth gear by using the first gear shift map M1, and the speed of the engine 1 is reduced.

Figure 5:
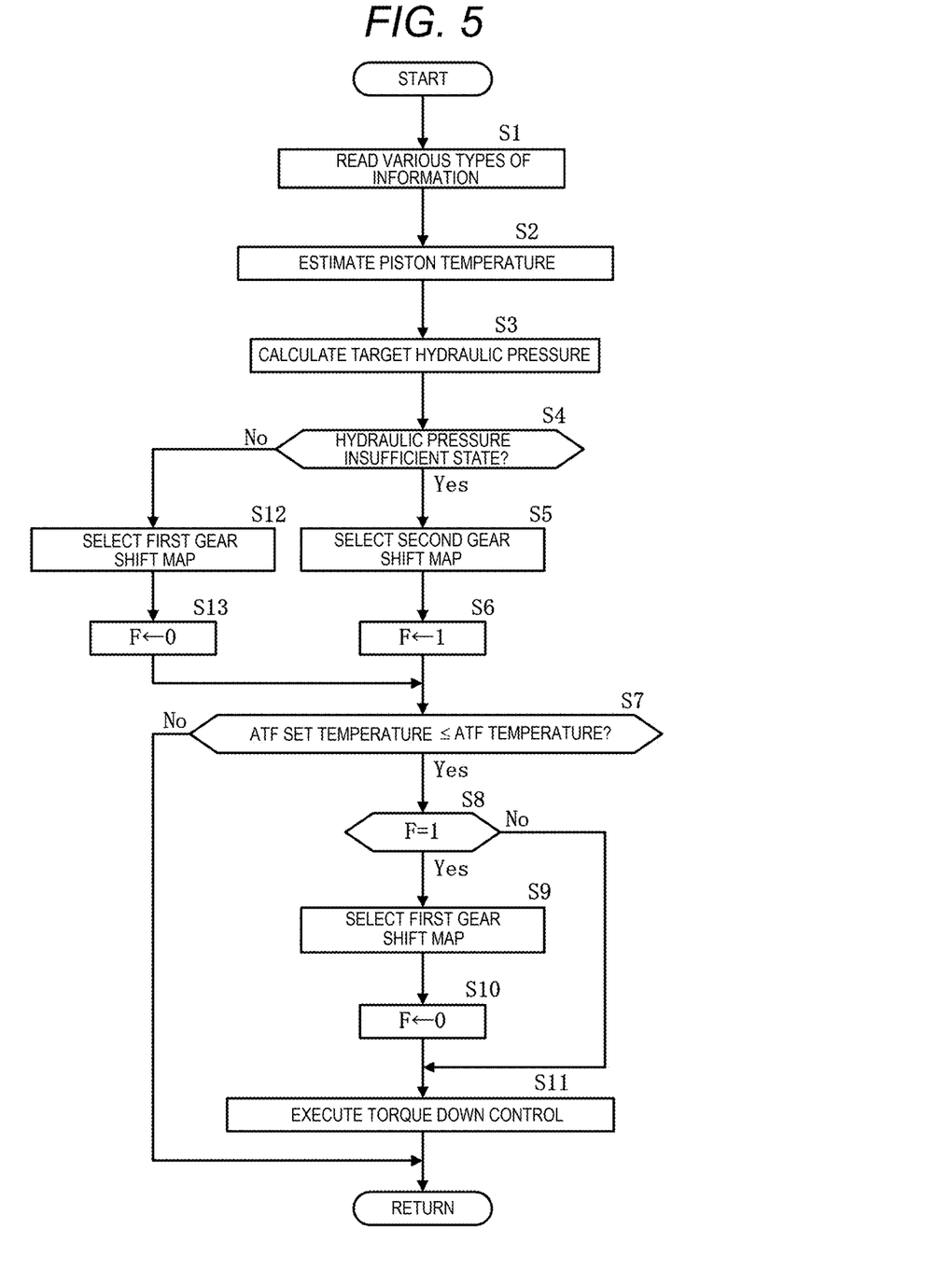
FIG. 5 is a flowchart illustrating a procedure of shift pattern changing control processing.

Next, a description will be made on an exemplary procedure of shift pattern changing control processing that is executed by the ECU 40 with reference to a flowchart illustrated in FIG. 5. In the drawing, Si (i=1, 2, . . . ) represents each step.

First, in S1, the ECU 40 reads the various signals that are input from the sensors 41 to 47, the various control maps, and the like, and then processing proceeds to S2.

In S2, the simulation is used to estimate the piston temperature. Then, by using the estimated piston temperature and the target hydraulic pressure map, the target hydraulic pressure that corresponds to the injection oil amount that is required to cool the piston is calculated (S3).

Next, it is determined whether the hydraulic pressure of the oil that is pressure-fed from the oil pump 4 is in the hydraulic pressure insufficient state (S4). The hydraulic pressure insufficient state is determined in the case where the period in which the deviation between the actual hydraulic pressure and the target hydraulic pressure of the oil is equal to or larger than the threshold value continues for the specified time or in the case where the oil temperature is equal to or higher than the set temperature.

As a result of the determination in S4, if it is determined as the hydraulic pressure insufficient state, the second gear shift map M2 is selected to increase the engine speed and thereby increase the discharge volume of the oil pump 4 (S5). Then, after 1 is assigned to the flag F (S6), the processing proceeds to S7. By changing the travel state from the sixth-gear travel state to the fifth-gear travel state, the speed of the engine 1 is increased, and the limit hydraulic pressure of the oil pump 4 is increased to exceed the actuation pressure of each of the oil jets 17a to 17f.

As the result of the determination in S4, if it is not determined as the hydraulic pressure insufficient state, there is no need to increase the discharge volume of the oil pump 4 by increasing the engine speed. Thus, the first gear shift map M1 is selected (S12). Then, after 0 is assigned to the flag F (S13), the processing proceeds to S7.

In S7, it is determined whether the ATF temperature is equal to or higher than the ATF set temperature.

As a result of the determination in S7, if the ATF temperature is equal to or higher than the ATF set temperature, the product reliability of the automatic transmission 2 is possibly degraded. Thus, the processing proceeds to S8. As the result of the determination in S7, if the ATF temperature is lower than the ATF set temperature, there is no possibility that the product reliability of the automatic transmission 2 is degraded. Thus, the processing returns without executing the torque down control.

In S8, it is determined whether the flag F is 1.

As a result of the determination in S8, if the flag F is 1, the second gear shift map M2 has already been selected. Thus, the first gear shift map M1 is selected instead of the second gear shift map M2 (S9). Then, after 0 is assigned to the flag F (S10), the processing proceeds to S11. In the shift pattern changing control using the second gear shift map M2, the ATF temperature is further increased along with an increase in the engine speed. Thus, the shift pattern changing control returns to the normal control using the first gear shift map M1, and the increase in the ATF temperature is thereby suppressed.

In S11, the torque down control is executed, and then the processing returns.

In the torque down control, the fuel injection amount is reduced for correction. In this way, the engine speed is reduced to actively reduce the ATF temperature.

Next, a description will be made on action and effects of the lubrication system S for the engine 1.

According to this lubrication system S for the engine 1, the ECU 3 has the hydraulic pressure state determination section 32 capable of determining the hydraulic pressure state of the oil that is injected from each of the oil jets 17a to 17f. Thus, it is possible to determine the hydraulic pressure state of the oil that is actually injected from each of the oil jets 17a to 17f. When the hydraulic pressure state determination section 32 determines the hydraulic pressure insufficient state where the actual hydraulic pressure of the oil that is injected from each of the oil jets 17a to 17f is insufficient for the target hydraulic pressure, the ECU 3 changes the gear stage of the automatic transmission 2 to the lower gear stage. Thus, it is possible to increase the speed of the engine 1 for driving the oil pump 4 by using an existing gear shift function of the automatic transmission 2 and thus to increase the limit hydraulic pressure of the oil pump 4. Therefore, even when the piston is the iron piston with low thermal conductivity, it is possible to avoid carbonization of the lubrication oil in a ring groove section or the like.

The hydraulic pressure sensor 45 capable of detecting the hydraulic pressure of the oil that is injected from each of the oil jets 17a to 17f is provided. The hydraulic pressure state determination section 32 determines the hydraulic pressure insufficient state in the case where the period in which the deviation between the actual hydraulic pressure that is detected by the hydraulic pressure sensor 45 and the target hydraulic pressure is equal to or larger than the threshold value continues for the specified time.

In this way, it is possible to directly determine the hydraulic pressure insufficient state by using the deviation between the hydraulic pressure of the oil that is pressure-fed from the oil pump 4 and the target hydraulic pressure.

The oil temperature sensor 44 capable of detecting the temperature of the oil that is injected from each of the oil jets 17a to 17f is provided. The hydraulic pressure state determination section 32 determines the hydraulic pressure insufficient state in the case where the oil temperature that is detected by the oil temperature sensor 44 is equal to or higher than the set temperature. In this way, it is possible to indirectly determine the hydraulic pressure insufficient state by using the temperature of the oil that is pressure-fed from the oil pump 4 as a parameter.

The automatic transmission 2 has the first and second gear shift maps M1, M2 capable of setting the gear stage that can be established by using any of the plural gear shift lines defined with the vehicle speed and the accelerator pedal position (the load) as parameters. When the hydraulic pressure state determination section 32 determines the hydraulic pressure insufficient state, the ECU 3 shifts at least one of the plural gear shift lines to the higher speed side. Thus, it is possible to secure the injection oil amount that is required to cool the piston by a simple configuration as shifting of the gear shift lines.

When the hydraulic pressure state determination section 32 determines the hydraulic pressure insufficient state, the ECU 3 shifts the sixth gear shift line for the shift-up to the sixth gear as the highest gear stage among the plural gear shift lines to the higher speed side. Thus, it is possible to secure the injection oil amount that is required to cool the piston while minimizing specification changes.

The ATF oil temperature sensor 46 capable of detecting the oil temperature of the automatic transmission 2 is provided. When the ATF oil temperature of the automatic transmission 2 that is detected by the ATF oil temperature sensor 46 is equal to or higher than the ATF set temperature, the ECU 3 returns the gear stage, which has been changed to the lower gear stage, to the original gear stage. Thus, it is possible to simultaneously secure the reliability of the automatic transmission 2 and the injection oil amount of each of the oil jets 17a to 17f.

When the ATF oil temperature that is detected by the ATF oil temperature sensor 46 is equal to or higher than the ATF set temperature, the engine output is reduced. Thus, it is possible to actively reduce the engine speed and to further improve the reliability of the automatic transmission.

Second Embodiment

Next, a description will be made on a lubrication system SA according to a second embodiment with reference to FIG. 6.

In the first embodiment, the entire sixth gear shift line for the shift-up to the sixth gear has the completely different patterns in the first gear shift map M1 selected during the normal travel and the second gear shift map M2 selected in the hydraulic pressure insufficient state. In the second embodiment, the sixth gear shift line has partially different patterns in the first gear shift map M1 and a second gear shift map M3.

Figure 6:
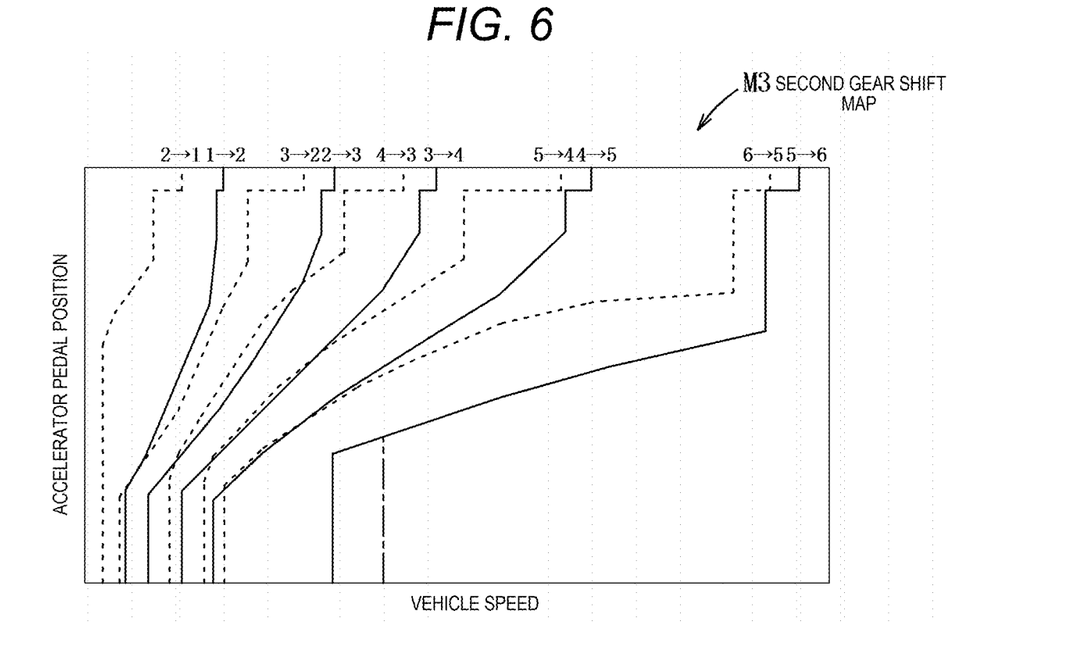
FIG. 6 is a map according to a modified embodiment that corresponds to FIG. 4.

As illustrated in FIG. 6, in the second gear shift map M3, gear shift lines that define the shift-ups (solid lines) from the first gear to the sixth gear and gear shift lines that define the shift-downs (broken lines) in the hydraulic pressure insufficient state are set. The sixth gear shift line in the second gear shift map M3 is set by partially shifting a low-load range of the sixth gear shift line in the first gear shift map M1 to the higher vehicle speed side. The rest of the region is the same. In this way, it is possible to minimize the specification changes.

In addition, a shifting amount to the higher vehicle speed side may be increased as the deviation between the actual hydraulic pressure that is detected by the hydraulic pressure sensor 45 and the target hydraulic pressure is increased (see a one-dot chain line in FIG. 6). In this way, the hydraulic pressure insufficient state can promptly be canceled.

Next, a description will be made on modified embodiments in which the embodiment described above is partially modified.

1] In the above embodiment, the description has been made on the example of the automatic transmission 2 capable of shifting the gear among the first gear to the sixth gear in the D range on the basis of the gear shift map. However, the shift patterns only need to be set by the gear shift lines, and the specification of the transmission such as the number of the gear stages can be set arbitrarily.

2] In the above embodiment, the description has been made on the example in which it is determined as the hydraulic pressure insufficient state in the case where the period in which the deviation between the actual hydraulic pressure and the target hydraulic pressure of the oil is equal to or larger than the threshold value continues for the specified time. However, the threshold value and the specified time can be set to have any values according to specifications of the oil jets. The description has been made on the example in which it is determined as the hydraulic pressure insufficient state in the case where the oil temperature is equal to or higher than the set temperature. However, the set temperature can be set to have any value according to the specifications of the oil jets. Furthermore, the description has been made on the example in which it is determined as the hydraulic pressure insufficient state in the case where the period in which the deviation between the actual hydraulic pressure and the target hydraulic pressure of the oil is equal to or larger than the threshold value continues for the specified time or in the case where the oil temperature is equal to or higher than the set temperature. However, the hydraulic pressure insufficient state may be determined by using any one of the above cases.

3] In the above embodiment, the description has been made on the example in which the piston temperature is first estimated, and the target hydraulic pressure is calculated by applying the estimated piston temperature to the target hydraulic pressure map. However, the step of estimating the piston temperature may be eliminated, and the target hydraulic pressure may be calculated by using the output values from the sensors 41, 43, 44, 47 and a specified conversion map in the fuel control section 31.

4] In the above embodiment, the description has been made on the example in which, when the hydraulic pressure insufficient state is determined, the sixth gear shift line as the highest gear stage is only changed. However, the gear shift line for the highest gear stage only needs to be shifted to the higher side, and the gear shift line for the fifth gear or lower that is not the highest gear stage may be shifted to the higher side.

5] In addition to the above, those skilled in the art can implement a mode, in which various modifications are added to the embodiment, or a mode, in which the embodiments are combined, without departing from the gist of the present disclosure, and the present disclosure includes such modified modes.

The following description relates to a computer environment in which embodiments of the present disclosure may be implemented. This environment may include an embedded computer environment, local multi-processor embodiment, remote (e.g., cloud-based) environment, or a mixture of all the environments.

Figure 8:
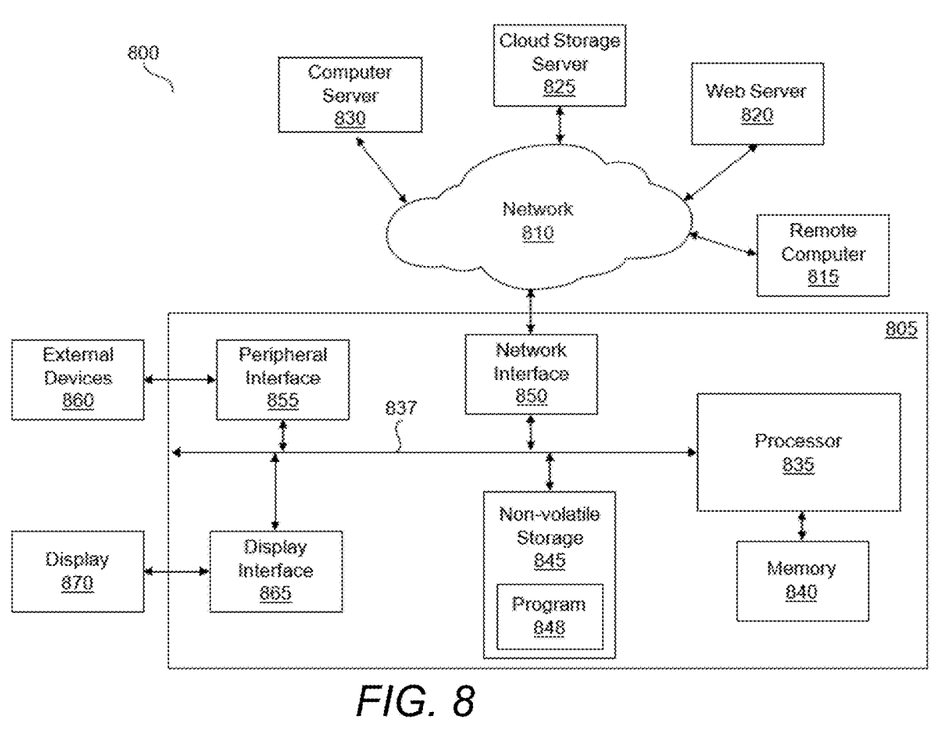
FIG. 8 is a block diagram of a computer-based circuitry that may be used to implement control features of the present disclosure.

FIG. 8 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 8 is a functional block diagram illustrating a networked system 800 of one or more networked computers and servers. In an embodiment, the hardware and software environment illustrated in FIG. 6 may provide an exemplary platform for implementation of the software and/or methods according to the present disclosure.

Referring to FIG. 8, a networked system 800 may include, but is not limited to, computer 805, network 810, remote computer 815, web server 820, cloud storage server 825 and compute server 830. In some embodiments, multiple instances of one or more of the functional blocks illustrated in FIG. 8 may be employed.

Additional detail of computer 805 is shown in FIG. 8. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

DESCRIPTION OF REFERENCE SIGNS AND NUMERALS

1: Engine
2: Automatic transmission
3: ECU
4: Oil pump
17a to 17f: Oil jet
32: Hydraulic pressure state determination section
44: Oil temperature sensor
45: Hydraulic pressure sensor
46: ATF oil temperature sensor
M1: First gear shift map
M2, M3: Second gear shift map
S, SA: Lubrication system

The invention claimed is:

1. An engine lubrication system comprising:
an oil pump configured to be driven by an engine;
an oil jet mechanism configured to inject oil pressure-fed by the oil pump to a piston of the engine; and
circuitry configured to
set a target hydraulic pressure of the oil injected from the oil jet mechanism according to an operation state of the engine;
determine a hydraulic pressure state of the oil injected from the oil jet mechanism; and
change a gear stage of the automatic transmission to a lower gear stage in a case that a predetermined condition is satisfied, wherein the predetermined condition includes the determined hydraulic pressure being below the target hydraulic pressure.

2. The engine lubrication system of claim 1, further comprising:
the automatic transmission.

3. The engine lubrication system of claim 1, further comprising:
one or more sensors configured to detect the hydraulic pressure of the oil injected from the oil jet mechanism.

4. The engine lubrication system of claim 3, wherein
the predetermined condition is satisfied in a case that a deviation between the detected hydraulic pressure and the target hydraulic pressure is equal to or larger than a threshold value for a predetermined period of time.

5. The engine lubrication system of claim 1, further comprising:
a sensor configured to detect a temperature of the oil injected from the oil jet mechanism.

6. The engine lubrication system of claim 5, wherein
the circuitry is configured to perform control to return the gear stage, which has been changed to the lower gear stage, to a higher gear stage in a case that the detected oil temperature is equal to or higher than a set temperature.

7. The engine lubrication system of claim 5, wherein
the predetermined condition includes the detected oil temperature being less than the set temperature.

8. The engine lubrication system of claim 1, further comprising:
a gear shift map used for setting a gear stage of the automatic transmission based on one of plural gear shift lines defined with a vehicle speed and a load as parameters.

9. The engine lubrication system of claim 8, wherein the circuitry is configured to control shifting at least one gear shift line of the plural gear shift lines to a higher speed in a case that the predetermined condition is satisfied.

10. The engine lubrication system according to claim 8, wherein
the circuitry is configured to control shifting the gear shift line for a highest gear stage among the plural gear shift lines to a higher speed in a case that the predetermined condition is satisfied.

11. The engine lubrication system of claim 1, further comprising:
one or more sensors configured to detect an oil temperature of the automatic transmission.

12. The engine lubrication system of claim 11, wherein
the circuitry is configured to perform control to return the gear stage, which has been changed to the lower gear stage, to the original gear stage in a case that the detected oil temperature of the automatic transmission is equal to or higher than an automatic transmission set temperature.

13. The engine lubrication system according to claim 11, wherein
the circuitry is configured to perform control to reduce engine output in a case that the detected oil temperature is equal to or higher than an automatic transmission set temperature.

14. A vehicle comprising:
an engine;
an automatic transmission;
an oil pump configured to be driven by the engine;
an oil jet mechanism configured to inject oil pressure-fed by the oil pump to a piston; and
circuitry configured to
determine a target hydraulic pressure of the oil injected from the oil jet mechanism based on an operation state of the engine;
detect a hydraulic pressure of the oil injected from the oil jet mechanism; and
change a gear stage of the automatic transmission to a lower gear stage in a case that a predetermined condition is satisfied, wherein the predetermined condition included the determined hydraulic pressure being below the target hydraulic pressure.

15. The vehicle of claim 14, wherein
the predetermined condition is satisfied in a case that a deviation between the detected hydraulic pressure and the target hydraulic pressure is equal to or larger than a threshold value for a predetermined period of time.

16. A method performed by an engine lubrication system including an oil pump configured to be drive by an engine, and an oil jet mechanism configured to inject oil pressure-fed by the oil pump to a piston of the engine, the method comprising:
setting a target hydraulic pressure of the oil injected from the oil jet mechanism according to an operation state of the engine;
detecting a hydraulic pressure state of the oil injected from the oil jet mechanism; and
changing a gear stage of the automatic transmission to a lower gear stage in a case that a predetermined condition is satisfied, wherein the predetermined condition includes the determined hydraulic pressure being below the target hydraulic pressure.

17. The method of claim 16, wherein
the predetermined condition is satisfied in a case that a deviation between the detected hydraulic pressure and the target hydraulic pressure is equal to or larger than a threshold value for a predetermined period of time.

* * * * *